Nov. 23, 1926. 1,607,896
J. A. KELLY
FLEXIBLE SOLE SHOE
Original Filed April 27, 1923
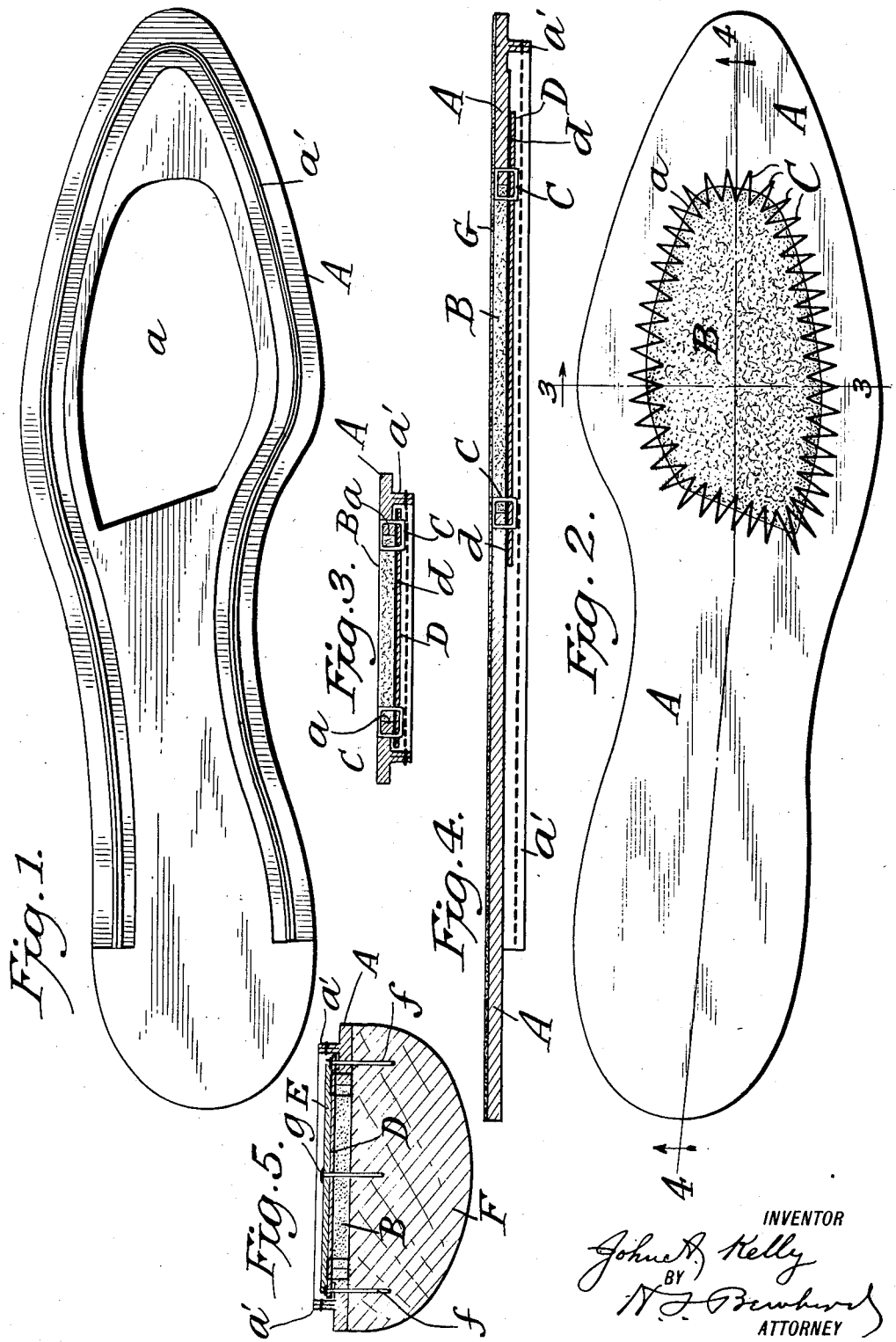
INVENTOR
John A. Kelly
BY
ATTORNEY Patented Nov. 23, 1926.

1,607,896

UNITED STATES PATENT OFFICE.

JOHN A. KELLY, OF BROOKLYN, NEW YORK.

FLEXIBLE-SOLE SHOE.

Application filed April 27, 1923, Serial No. 634,933. Renewed October 4, 1926.

This invention is a flexible sole shoe, a characteristic feature of which is an insole of novel construction possessing the inherent quality of flexibility, which insole is cooperable with an upper and an outsole to impart to the resulting shoe the desired flexibility to the end that the shoe is worn with ease and comfort In my invention, the insole is skeletonized by cutting out the middle longitudinal portion thereof at the forepart, and with such cut out (or "died" out) part of the insole are combined a filler and a fabric, the combination being of such character as to secure important functions, one of which is to impart a desirable wet-proof quality to the insole, and another function is to preclude distortion or stretching of the materials when the stitching and lasting operations are performed on the upper and the insole.

The filler is composed of a flexible material suitable for the purpose, the thickness of which is equal substantially to the thickness of the insole, and the form and dimensions of which filler correspond substantially to the cut out portion of the insole, whereby the filler is adapted to occupy the opening produced by the cut out, and said filler is flush, or substantially so, with the top and bottom surfaces of the insole.

It is desirable to attach the skeletonized insole and the filler in a manner to retain them in fixed relation, and to this end it is preferred to stitch the filler and the insole, for which purpose a seam of the "herring bone" variety is utilized.

The fabric is a layer composed of appropriate fibrous material, coated on one surface with an adhesive of a character to preclude moisture, said material being ordinarily referred to as a "wet prooof" layer. Said wetprooof layer is applied to the face of the insole on that side thereof against which the outsole is positioned. As usual, the insole is provided with a lip extending from one face thereof, against which lip the upper is lasted and to which said upper is stitched, and within this lip is positioned the layer of wet proof material in a manner to be cemented to the filler and to the insole.

Other functions and advantages of the invention will appear from the following description taken in connection with the drawings, wherein:—

Figure 1 is a plan view of the cut out insole looking at the under face thereof and showing the lip thereon.

Figure 2 is a top plan view of the insole with the filler positioned within the cut out portion and illustrating the stitching by which the filler and the insole are fixedly attached.

Figure 3 is a cross section, and Figure 4 a longitudinal section, on the lines 3—3 and 4—4, respectively, of Figure 2, a sock lining being shown in Figure 4 on the inner face of the composite insole.

Figure 5 is a cross section of the insole applied to a last prior to lasting the upper, said view showing a stiffener layer used in conjunction with the composite insole to serve the function of a temporary insole when lasting and stitching.

An insole A, composed of the usual material, leather, is cut out at $a$, in the middle longitudinal portion of the forepart, leaving the side and end portions intact and continuous, said insole being provided on the forepart and the shank with a lip $a'$.

B is a filler for the opening $a$ produced by cutting out the insole, said filler being composed of material suitable for the purpose, felt being preferred. The thickness of the felt filler is equal to the thickness of the leather constituting the insole, and the form and dimensions of said felt filler correspond to the cut out $a$ of said insole. The felt is assembled with the insole by placing said filler within the opening $a$ whereby the opening is closed by the filler and the latter is flush, or substantially so, with the top and botttom surfaces of the insole. The insole and the filler are not skived, thus saving labor in the production of the materials.

The stitching by which the filler is fixedly attached to the insole is indicated at C, said stitching being usually of the "herring bone" variety, so-called, with the stitches passing alternately through the materials comprising the felt, a fabric layer, and the insole, and crossing the line of contact between the edges of the filler and the insole.

D is a fabric layer composed of wet proof material, i. e. a piece of fibrous material with a coating of adhesive $d$ on one face thereof. Said fabric layer corresponds to the shape and dimensions of the insole within the area bounded by the lip $a'$, and said fabric layer is positioned with its adhesively coated face next to the felt and the insole, with the edges of said fabric layer quite close to the lip $a'$. This fabric layer is laid smoothly against the insole and the felt filler, and its adhesive coating operates to cement the fabric layer firmly to the leather and felt materials composing the insole and the filler, said fabric being united by seam C to the insole and the felt.

An insole comprising the leather layer, the felt and the fabric possesses flexibility so desirable in shoe insoles, and such insole is produced economically and with a minimum of labor for the reason that the insole around the edges of opening $a$ is not skived, nor are the edges of the felt material skived, these parts being simply cut out, assembled, and stitched together.

In lasting a shoe, the insole, is placed upon a last F as in Figure 4, tacks $f$ are driven to confine the insole on said last, and a stiffening piece as E is laid over the insole and the felt filler, after which the piece E is tacked at $g$, the lip $a'$ extending upwardly. The upper is now lasted as usual, the lip is trimmed, and the outsole is attached, the lasting tacks $f$, $g$, being removed and the stiffener E displaced. After the shoe is made, a sock lining G is attached to the upper face of the insole so as to cover the felt filler B and the stitches C, the felt filler affording a backing for the sock lining so that it will remain in a smooth non-wrinkled condition within the shoe.

The composite insole affords the required flexibility to the shoe; the felt filler stitched to the insole and with the fabric attached precludes stretching or distortion of the insole when the upper is lasted and stitched, and the adhesive coating $d$ on the fabric is of a wet proof character (rubber cement) so as to impart the required wet proof quality to the shoe.

Having thus fully described the invention, what I claim as new and desire to secure by Letters Patent is:

An insole for flexible sole shoes comprising a layer provided in the forepart with an opening and having on one face thereof a lip positioned intermediate said opening and the edge of said layer, a felt filler occupying the opening in said layer, a second layer composed of wet-proof fabric adhesively united to the first layer and the felt filler, said second layer being attached to that face of the first layer on which is provided said lip and the edges of the second layer terminating close to the lip, and a zigzag seam the stitches of which pass alternately through the first layer and the felt filler, said seam operating to attach the second layer to the first layer, on a line adjacent the lip.

In testimony whereof I have hereto signed my name this 2nd day of April 1923.

JOHN A. KELLY.